Patented Feb. 16, 1937

2,070,576

UNITED STATES PATENT OFFICE 2,070,576

PROCESS FOR THE MANUFACTURE OF DISINTEGRATION PRODUCTS OF STARCH

Benno Bochskandl, Hamburg, Germany, assignor, by mesne assignments, to International Patents Development Company, Wilmington, Del., a corporation of Delaware No Drawing. Application June 29, 1933, Serial No. 678,320. In Germany April 15, 1931

2 Claims. (Cl. 127—32)

This invention relates to the manufacture of starch products by the known disintegration processes, and has for its object to obtain products of this nature having properties which enable the said products, after being boiled with water, to be converted into transparent, flexible films. These films, with or without a backing or support, may be utilized, generally speaking, for the same purposes as the known cellulose ester foils or films, in comparison with which they possess the considerable advantage of greater cheapness.

According to the invention, the disintegration process is terminated according to the film-forming properties of the products when boiled with water, whereupon the subsequent treatment takes place in the usual manner, that is to say—washing and drying is performed, should this be necessary, or the product is boiled immediately in water, and the mass thus obtained applied to the backing or to any other support, from which, after drying, the finished film may be removed. Particularly favorable results are obtained when employing corn starch and utilizing as disintegration process the alkaline hypochlorite form of treatment in a cold state. Alkaline hypochlorite disintegration in a cold state is certainly known per se in connection with starch. This process, however, has merely been employed in such a form as to lead to glue-like products, more particularly of a clearly soluble kind. In contradistinction thereto the products according to the invention are practically insoluble in cold water.

It has also been proposed in connection with corn starch to interrupt the alkaline disintegration at quite a certain stage, which is determined by the desired thread-drawing properties. A product of this nature, however, does not constitute a film-forming product within the meaning of the invention.

The invention will now be described more particularly in the following example.

Washed corn starch in the form of a watery (approximately 35%) solution is admixed gradually at ordinary temperature in a vat furnished with an agitating mechanism with a watery alkaline solution of sodium hypochlorite containing 6%–8% active chlorine. The addition is so proportioned that the chlorine amounts to approximately 6% taken in relation to the weight of the starch. After the addition of the sodium hypochlorite mixing is performed for a certain length of time, which depends upon the particular purpose for which the disintegration mass is to be employed. In order, for example, to produce the film-forming starch above referred to, disintegration is performed over a period of approximately 12–15 hours, whereupon the process is interrupted, for example by adding to the mixture sulphuric acid in an amount corresponding to the alkalinity thereof, until a sample taken from the mixture reacts neutrally against phenolphthaleine. In place of the neutralization there may also be added thiosulphate.

Exact determination of the desired degree of disintegration is made by taking samples which, after brief washing, are boiled in the known manner in water in approximately 25% solution and poured when still hot on to celluloid.

If after cooling a transparent film results, which is as clear as glass and does not reveal cracks, even when bent, and which may be removed from the support in one piece, the disintegration process has been completed.

After interruption of the disintegration the substance is filtered in desired fashion, and washed for such time until the water employed is practically free of chlorides. The filter cake is then reduced in size and again soaked in water, filtered and finally dried.

It will be understood that no restriction is made to the specific example quoted, which serves merely to illustrate the practical execution of the invention, and that numerous modifications are quite possible within the meaning of the above description and the annexed claims without departing from the spirit of the invention.

What I claim as new and desire to secure by Letters Patent is:

1. Process for the manufacture of films or the like which consists in subjecting an unheated suspension of corn starch in water to the action of a solution of sodium hypochlorite and when the material reaches the stage at which, if boiled in water, it is capable of forming a film substantially insoluble in cold water and having sufficient tenacity to be self sustaining, adding an acid in an amount to neutralize the alkalinity of the material, filtering the material and boiling the same in water.

2. Process for the manufacture of films or the like which consists in subjecting an unheated suspension of corn starch in water to the action of a solution of an alkaline hypochlorite and when the material reaches the stage at which, if boiled in water, it is capable of forming a film substantially insoluble in cold water and having sufficient tenacity to be self sustaining, adding an acid in an amount to neutralize the alkalinity of the material, filtering the material and boiling the same in water.

BENNO BOCHSKANDL.